United States Patent
Casey et al.

(10) Patent No.: US 7,989,511 B2
(45) Date of Patent: Aug. 2, 2011

(54) PROCESS AND APPARATUS FOR SYNTHESIS GAS AND HYDROCARBON PRODUCTION

(75) Inventors: Daniel Glenn Casey, Kingwood, TX (US); Lixin You, Sugar Land, TX (US); Curtis Lee Krause, Houston, TX (US); Kevin Hoa Nguyen, Missouri City, TX (US)

(73) Assignee: Texaco Inc., San Ramon, CA (US)

( * ) Notice: Subject to any disclaimer, the term of this patent is extended or adjusted under 35 U.S.C. 154(b) by 465 days.

(21) Appl. No.: 12/124,671

(22) Filed: May 21, 2008

(65) Prior Publication Data

US 2009/0292030 A1  Nov. 26, 2009

(51) Int. Cl.
  *C07C 27/00* (2006.01)
(52) U.S. Cl. ........ 518/715; 518/702; 518/703; 518/704; 518/717
(58) Field of Classification Search .................. 518/700, 518/702, 703, 704, 715, 717
  See application file for complete search history.

(56) References Cited

U.S. PATENT DOCUMENTS

| | | | |
|---|---|---|---|
| 4,238,204 A | 12/1980 | Perry | |
| 4,690,695 A | 9/1987 | Doshi | |
| 4,973,453 A | 11/1990 | Agee | |
| 5,252,613 A | 10/1993 | Chang et al. | |
| 5,256,174 A | 10/1993 | Kai et al. | |
| 5,348,982 A | 9/1994 | Herbolzheimer et al. | |
| 5,435,836 A | 7/1995 | Anand et al. | |
| 5,669,960 A | 9/1997 | Couche | |
| 5,741,474 A | 4/1998 | Isomura et al. | |
| 5,753,010 A | 5/1998 | Sircar et al. | |
| 6,063,161 A | 5/2000 | Keefer et al. | |
| 6,130,259 A | 10/2000 | Waycuilis | |
| 6,322,755 B1 | 11/2001 | Hoek et al. | |
| 6,406,523 B1 | 6/2002 | Connor et al. | |
| 6,471,744 B1 | 10/2002 | Hill | |
| 6,479,557 B1 | 11/2002 | Lange et al. | |
| 6,767,389 B2 | 7/2004 | Edlund et al. | |
| 6,796,332 B1 | 9/2004 | Nguyen et al. | |

(Continued)

FOREIGN PATENT DOCUMENTS

EP  0 592 176 A1  4/1994

(Continued)

OTHER PUBLICATIONS

Fierro et al., "Oxidative reforming of biomass derived ethanol for hydrogen production in fuel cell applications", 75 Catalysis Today (2002), pp. 141-144.

(Continued)

*Primary Examiner* — Jafar Parsa
(74) *Attorney, Agent, or Firm* — Melissa Patangia; Christopher D. Northcutt

(57) ABSTRACT

A process and apparatus for preparing a synthesis gas suitable for feeding to a suitable hydrocarbon production reactor, such as a Fischer Tropsch reactor is described. According to one aspect, the process and apparatus utilize heat exchangers that thermally integrate the reaction steps such that heat generated by exothermic reactions, e.g., combustion, are arranged closely to the heat sinks, e.g., cool methane, water and air, to minimize heat loss and maximize heat recovery. Effectively, this thermal integration eliminates excess piping throughout, reduces initial capital and operating costs, provides built-in passive temperature control, and improves synthesis gas production efficiencies.

21 Claims, 4 Drawing Sheets

U.S. PATENT DOCUMENTS

| | | |
|---|---|---|
| 6,818,198 B2 | 11/2004 | Singh et al. |
| 6,878,362 B2 | 4/2005 | Kumar et al. |
| 6,939,999 B2 | 9/2005 | Abazajian et al. |
| 7,005,113 B2 | 2/2006 | Edlund et al. |
| 7,108,835 B2 | 9/2006 | Hawthorne et al. |
| 7,195,663 B2 * | 3/2007 | Edlund et al. ............. 96/4 |
| 2003/0044331 A1 | 3/2003 | DeBellis et al. |
| 2004/0197238 A1 | 10/2004 | Mirkovic et al. |
| 2006/0225349 A1 | 10/2006 | Krause et al. |
| 2006/0248800 A1 | 11/2006 | Miglin et al. |
| 2007/0254967 A1 * | 11/2007 | West et al. ............. 518/703 |

FOREIGN PATENT DOCUMENTS

| | | |
|---|---|---|
| WO | WO 00/01613 | 1/2000 |
| WO | WO 2005/107935 A1 | 11/2005 |
| WO | WO 2006/097904 A2 | 9/2006 |
| WO | WO 2006/097905 A1 | 9/2006 |

OTHER PUBLICATIONS

Cavallaro et al., "Hydrogen production by auto-thermal reforming of ethanol on Rh/Al2O3 catalyst", 123 J. Power Sorces (2003), pp. 10-16.

Garcia et al., "Hydrogen production by the steam reforming of ethanol: thermodynamic analysis", 16(5) Int. J. Hydrogen Energy (1991), pp. 307-312.

Haga et al., "Catalytic properties of supported cobalt catalysts for steam reforming of ethanol", 48 Catalysis Lett. (1997), pp. 223-227.

Fishtik et al., "A thermodynamic analysis of hydrogen production by steam reforming of ethanol via response reactions", 25 Int. J. Hydrogen Energy (2000), pp. 31-45.

* cited by examiner

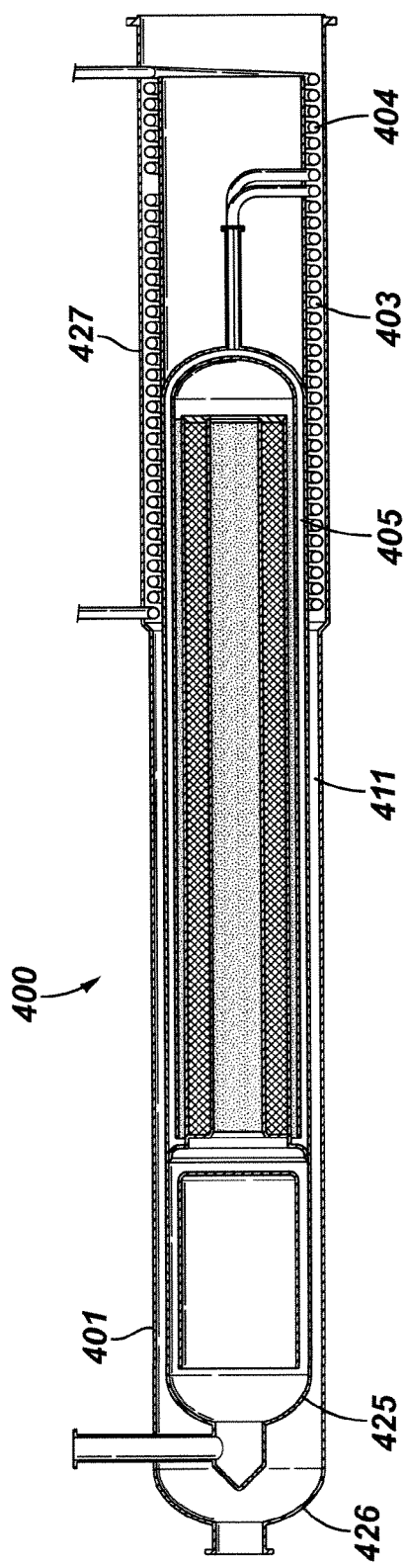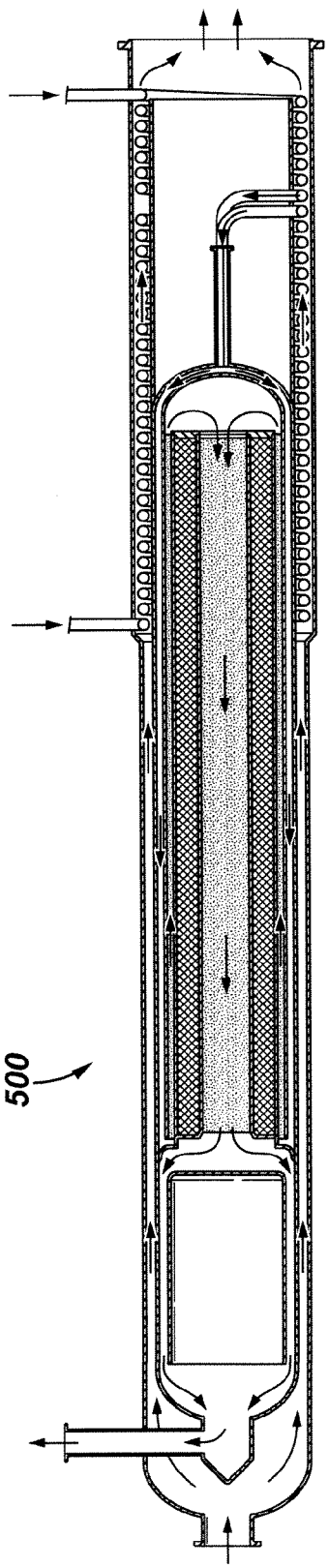
FIG. 4
FIG. 5

PROCESS AND APPARATUS FOR SYNTHESIS GAS AND HYDROCARBON PRODUCTION

FIELD

Provided herein is a process for preparation of a synthesis gas and an apparatus having a catalytic oxidizer and a reforming reactor and optionally a palladium membrane integrated in a single vessel assembly.

DESCRIPTION OF THE RELATED ART

Mixtures of hydrogen and carbon monoxide are often referred to as synthesis gas. Such synthesis gas can be used in numerous well-known processes to produce a large variety of organic compounds, such as production of methanol, and other compounds containing carbon, hydrogen and, optionally, oxygen moieties. One such process for the preparation of paraffinic hydrocarbons from a mixture of carbon monoxide and hydrogen (syngas) is Fischer-Tropsch synthesis. This synthesis process involves contacting syngas at elevated temperature and pressure with a Fischer Tropsch catalyst to yield paraffinic hydrocarbons.

The Fischer-Tropsch synthesis process typically consumes syngas at a $H_2$ to CO molar usage ratio of 2:1 to 3:1, depending on the length of the paraffinic hydrocarbons formed. A syngas feed having the desired $H_2$ to CO molar ratio is not readily available and can only be prepared at unacceptably high costs. Therefore, more efficient process are needed for production of synthesis gas.

In the art a number of processes are known to prepare syngas. To convert natural gas to syngas, the following four well established reforming technologies are used: steam reforming; partial oxidation (POX); autothermal reforming and combined or two-step reforming. Depending on the process for preparing syngas and the type of organic feed to such processes, the $H_2$ to CO molar ratio of the syngas may vary widely. One of the biggest challenges in choosing the process is to optimize the energy integration between, the syngas generation and syngas conversion sections.

Use of steam reforming reaction to convert natural gas (mostly methane) to syngas has certain disadvantage: syngas generated has a $H_2/CO$ ratio (>4) which is much higher than what is optimally needed by the Fischer-Tropsch section; lower methane conversion due to a maximum operating temperature of below 900° C.; and the high usage rate of water makes it unsuitable for arid regions.

If coal is used as organic feed in such a process, the $H_2$ to CO molar ratio of the resulting syngas is generally lower than if natural gas is used as organic feed. A process involving partial oxidation, either autothermal or catalytic, of natural gas typically produces syngas having a $H_2$ to CO molar ratio of 1.7:1. A partial oxidation process using coal or residual oil as organic feed typically produces syngas having a $H_2$ to CO molar ratio of 0.5:1.

Accordingly, there is a continuing need for processes to obtain a syngas having the desired $H_2$ to CO molar ratio at lower costs. Further, there is a need to integrate the process for generating the syngas having the desired $H_2$ to CO molar ratio to a Fischer Tropsch reactor such that the syngas can be use as a direct feed for hydrocarbon generation by Fischer Tropsch reaction.

SUMMARY OF THE INVENTION

In one embodiment, provided herein is a process for preparing a synthesis gas suitable for feeding to a suitable hydrocarbon production reactor, such as a Fischer Tropsch reactor. In another embodiment, provided is an apparatus useful for the process.

According to one aspect, the process and apparatus utilize heat exchangers that thermally integrate the reaction steps such that heat generated by exothermic reactions, e.g., combustion, are arranged closely to the heat sinks, e.g., cool methane, water and air, to minimize heat loss and maximize heat recovery. Effectively, this thermal integration eliminates excess piping throughout, reduces initial capital and operating costs, provides built-in passive temperature control, and improves synthesis gas production efficiencies.

According to another embodiment, the process is thermally neutral, such that a supplemental fuel, such as methane is no longer needed in order to achieve high reforming efficiency and conversion. This directly translates to lower operating costs.

According to another aspect, the surface areas and flow configurations of the heat exchangers are designed such that they serve the dual purposes of heat recovery/pre-heating and passive temperature control of process streams. For example, a heat exchanger can preheat a steam and natural gas feed for the reforming reactor with heat derived from a heated reformate while yielding an optimum inlet reformate temperature for the palladium membrane. Also, a heat exchanger can cool the reformate to a desired palladium membrane operating temperature and utilize this heat to convert water to saturated steam and/or to preheat a combustion reactant such as air. This thermal pinching/passive temperature control technique not only simplifies and adds robustness to the process controls, but also eliminates control valves and various other moving parts throughout the apparatus as well as the need for external cooling. Thus, according to one aspect, the only active control parameters of the process are setting and adjusting the air flow to the oxidizer and the natural gas and water flows to the reforming reactor. The uniqueness of this process flow design significantly drives down the capital cost of the system.

According to another aspect, an annular design in a single vessel allows for operating the oxidizer, reforming reactor and, palladium membrane, when present, at different pressure regimes without sacrificing heat loss.

In another aspect, by directly coupling the heat generating combustion reaction with the endothermic steam reforming reaction, heat transfer is balanced between the two reactions, heat recovery is maximized, control of steam reforming temperature is simplified, and the apparatus has fewer parts and less connecting piping.

According to another embodiment, there are at least three heat transfers that are utilized in the process and apparatus. First, is a first heat transfer in order to preheat air and/or a combustion feed gas with heat derived from the synthesis gas exiting the palladium membrane. A second heat transfer is directed to heating water, and optionally a methane-containing gas, with heat derived from an exhaust from a oxidizer and a reformate. A third heat transfer produces a cooled reformate by transferring heat to a reforming reactant.

In one embodiment, the process for preparing a synthesis gas provided herein comprises:
  (a) preheating air with a synthesis gas to form pre-heated air and a cooled synthesis gas;
  (b) combusting the preheated air and a combustion feed gas in a catalytic oxidizer to form an exhaust;
  (c) heating water with the exhaust to form heated water;
  (d) contacting a methane-containing gas and the heated water with a reformate to form steam, a heated methane-containing gas and a cooled reformate;

(e) reforming the steam and the heated methane-containing gas in a reforming reactor to form the reformate and (f) separating hydrogen from the cooled reformate in a palladium membrane to form a synthesis gas and hydrogen stream.

In another embodiment, the process for preparing a synthesis gas provided herein comprises:

(a) preheating air with a synthesis gas to form pre-heated air and a cooled synthesis gas;

(b) combusting the preheated air and a combustion feed gas in a catalytic oxidizer to form an exhaust;

(c) heating water with the exhaust to form heated water;

(d) contacting a methane-containing gas and the heated water with a reformate to form steam, a heated methane-containing gas and a cooled reformate;

(e) reforming the steam and the heated methane-containing gas in a reforming reactor to form the synthesis gas, while maintaining the temperature in the reforming reactor at about 700° C.-900° C. and the pressure at about 120-350 psi.

In certain embodiments, the process further comprises the step of reacting the synthesis gas in the presence of a Fischer Tropsch catalyst to form a liquid hydrocarbon composition.

In certain embodiments, provided herein is an annular apparatus for producing a synthesis gas comprising a oxidizer, an intermediate annulus comprising a reforming reactor and a palladium membrane disposed radially inward from the intermediate annulus.

In certain embodiments, the apparatus is for producing a liquid hydrocarbon product and further comprises an innermost annulus comprising a Fischer Tropsch reactor. Such an arrangement allows for the use of the synthesis gas exiting from the palladium membrane as a direct feed for the Fischer Tropsch reactor.

BRIEF DESCRIPTION OF THE DRAWING FIGURES

FIG. 4 is a schematic view of a vessel design according to an embodiment described herein.

FIG. 5 is a schematic illustration of a vessel designed according to an embodiment described herein.

DETAILED DESCRIPTION OF THE PREFERRED EMBODIMENTS

Figure 1:
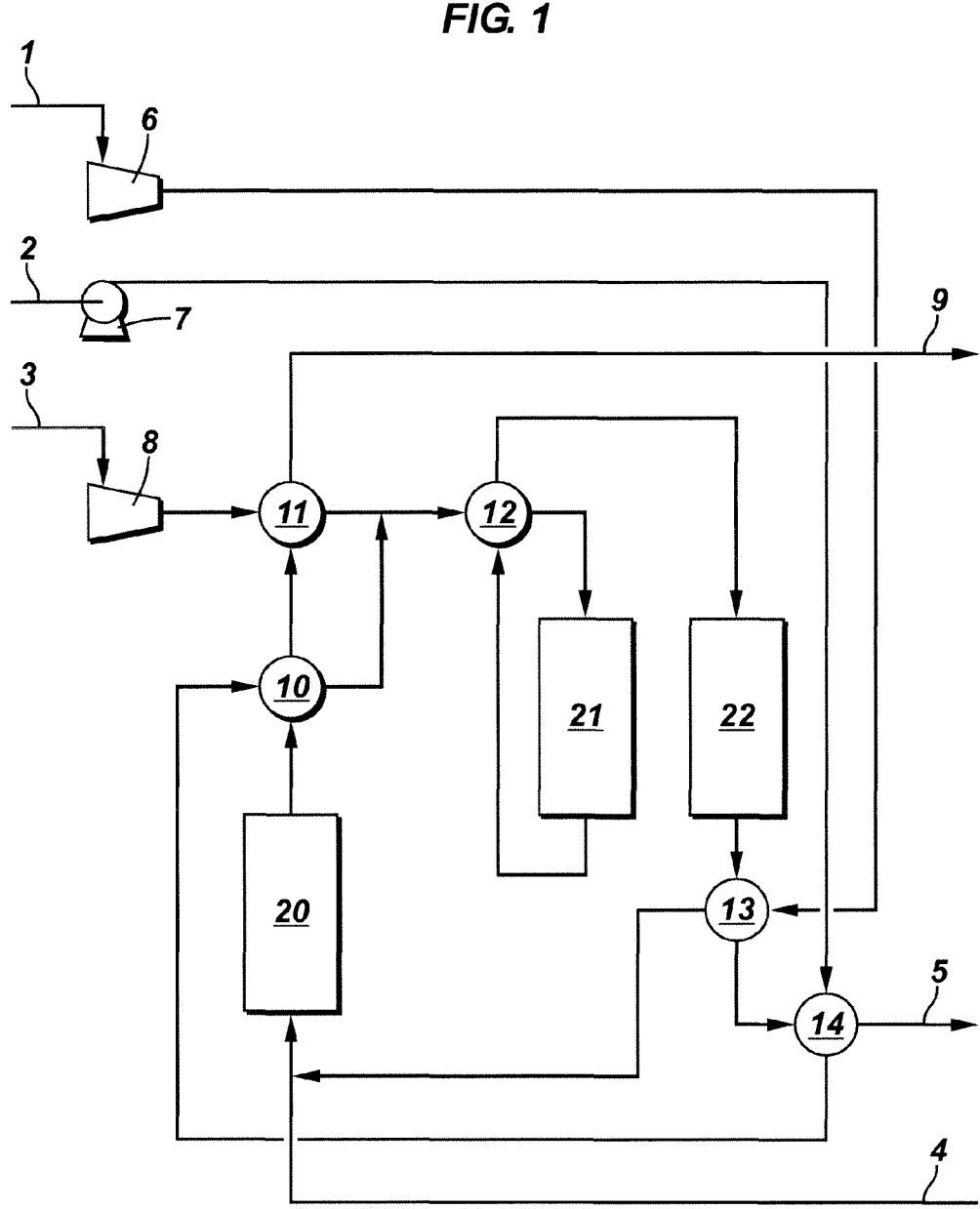
FIG. 1 is a schematic process flow diagram of an embodiment of the process described herein.

Provided herein is a process and apparatus to produce a synthesis gas via steam reforming of methane. In the synthesis gas generation process provided herein, methane is converted to synthesis gas comprising carbon monoxide and hydrogen. The process involves steam reformation to produce synthesis gas from methane and water. As used herein, the term "water" generally includes, liquid water, combinations of liquid water and steam, and steam, in one embodiment, the steam reforming reaction is thermally integrated with a catalytic combustion to improve thermal efficiency and synthesis gas production.

Steam methane reforming ("SMR") comprises an endothermic reaction requiring 57 kW of heat and proceeds according to the following equation:

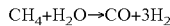

In one embodiment, the SMR reaction takes place in presence of a steam reforming catalyst. Any SMR catalyst known to one of skilled in the art could be used. Exemplary SMR catalysts include, but are not limited to rhodium, iridium, nickel, palladium, platinum, carbide of group VIb and combinations thereof. Typically, the catalysts comprise a catalyst carrier. In one embodiment, the catalyst carrier is porous, such as a porous inorganic refractory oxide. In one embodiment, the catalyst carrier is alumina, silica, titania, zirconia or mixtures thereof.

In one embodiment, the ratio of hydrogen to carbon monoxide in the synthesis gas is optimized such that the synthesis gas generated is suitable as a feed for a hydrocarbon generation process. In one embodiment, the ratio is adjusted by controlling the temperature and pressure during the steam reforming reaction. In one embodiment, the reforming reactor feed gas is at a temperature of about 700° C.-900° C. and at a pressure of about 120-350 psig. In one embodiment, the ratio is adjusted by lowering the flow of steam in the reactants.

In one embodiment, the reforming reaction is further integrated with a palladium membrane for separation of hydrogen. The hydrogen separation from the SMR product comprises passing the reformate in a palladium membrane to adjust the hydrogen to carbon monoxide ratio in the reformate such that the synthesis gas generated is suitable as a feed for a hydrocarbon generation process.

The hydrocarbon generation can be by any process known to one of skill in the art, such as Fischer Tropsch reaction. In certain embodiments, the synthesis gas produced in the process provided herein comprises a desired ratio of hydrogen to carbon monoxide required for Fisher Tropsch reaction. In one embodiment, the hydrogen to carbon monoxide ratio in the synthesis gas prepared by the process described herein is about 3:1. In one embodiment, the hydrogen to carbon monoxide ratio in the synthesis gas prepared by the process described herein is about 2.5:1; 2.3:1, 2.1:1 or 2:1. In another embodiment, the hydrogen to carbon monoxide ratio in the synthesis gas is about 2:1. The synthesis gas prepared by the process provided herein can be sent to a Fischer Tropsch reactor to produce a liquid hydrocarbon.

In one embodiment, the process for preparing a synthesis gas and hydrogen is conducted in a processor assembly comprising a reforming reactor, a palladium membrane, a catalytic oxidizer and the associated heat exchangers for heat recovery. In one embodiment, this integrated process is adapted to be coupled to a Fischer Tropsch reactor. The process flow is illustrated in FIG. 1.

As illustrated in FIG. 1, air 1 is supplied to the catalytic oxidizer 20 via the air blower 6. The air is preheated in heat exchanger 13 with synthesis gas 5 exiting a palladium membrane 22. In one embodiment, air 1, initially at ambient conditions, is preheated by heat exchanger 13 to about 300° C. and is supplied by air blower 6 at a pressure of at least about 1 psig. In another embodiment, the air 1 is preheated to about 350° C. at about 3 psig.

In an embodiment provided herein, air blower 6 can include any suitable air blower. In one embodiment, the air blower is one capable of supplying about 1800 kg/day of air at a pressure of at least 1 psig.

In certain embodiments, suitable heat exchangers can include, but are not limited to, coils, fins, shell-and-tube, plate and annular-type heat exchangers. A detailed description of a suitable annular-type heat exchanger may be had by reference to US 2003/0044331 A1, published Mar. 6, 2003 by Debellis et al., the description of which is incorporated herein by reference.

The preheated air and combustion feed gas 4 are fed to the catalytic oxidizer 20 and can be combined prior to being fed to the catalytic oxidizer 20. The combustion feed gas 4 can comprise any suitable combustion reactants known to one of skill in the art.

In the catalytic oxidizer 20, the preheated air and the combustion feed gas 4 are combusted over an oxidation catalyst to form an exhaust gas 9. In one embodiment, the exhaust gas 9 is at a temperature of at least about 760° C., in another embodiment, at a temperature of at least about 800° C. or 900° C.

Suitable catalytic oxidizers can include, but are not limited to, catalyst coated metal oxidizers, catalyst coated ceramic oxidizers, and packed-bed pelletized oxidizers.

Water 2 is supplied to reforming reactor 21 via pump 7. The water is preheated in heat exchanger 14 with synthesis gas 5 exiting heat exchanger 13. In one embodiment, water 2 is initially at ambient conditions and preheated by the exchanger 14 to about 85° C. and supplied by pump 7 at about 120 psig. In another embodiment, the water 2 is preheated by heat exchanger 14 so that the water 2 becomes saturated steam at pressure up to 350 psig.

Pump 7 can comprise any suitable pump, particularly one that is capable of supplying about 520 kg/day of water at a pressure up to 350 psig.

In one embodiment, heat exchanger 14 is sized such that the synthesis gas exiting the apparatus is at an optimum temperature and pressure for hydrocarbon generation reactor, such as a Fischer Tropsch reactor.

In one embodiment, the preheated water exiting heat exchanger 14 is in the form of saturated steam, and is passed through heat exchanger 10. In heat exchanger 10 the preheated water is heated with combustion exhaust 9 from the catalytic oxidizer 20. The heated water exiting heat exchanger 10 is in the form of super-heated steam at a pressure up to about 350 psig.

Methane-containing gas 3 is supplied to the reforming reactor 21 via the compressor 8. The methane-containing gas is preheated in heat exchanger 11 with exhaust 9 exiting heat exchanger 10. The methane-containing gas 3 is initially at ambient conditions and is then compressed in compressor 8 up to about 350 psig. The methane-containing gas is somewhat heated by virtue of its compression and is then heated in heat exchanger 11 to at least about 200° C.

In one embodiment, the methane-containing gas 3 is provided in the form of any suitable natural gas.

Compressor 8 can be any suitable compressor and, in one embodiment, is a compressor capable of supplying up to 150 kg/day of methane at a pressure up to about 350 psig.

Next, the heated water, in one embodiment, in the form of superheated steam, and preheated methane-containing gas are mixed to form a reforming reactor feed gas. This reforming reactor feed gas is preheated in heat exchanger 12 with the reformate exiting the reforming reactor 21. In one embodiment, the reforming reactor feed gas is at a steam reformation temperature of about 700° C.-900° C. In another embodiment, the reforming reactor feed gas is at least about 740° C., in another embodiment, is about 770° C. and in yet another embodiment, is about 800° C. In one embodiment, the reforming reactor feed gas is at a pressure of about 120-350 psig. In one embodiment, the reforming reactor feed gas is at a pressure of about 150, 200, 250, 300 or 350 psig. In one embodiment, the reforming reactor feed gas is at a steam reformation temperature of at least about 780° C. and a pressure of about 350 psig.

Heat exchanger 12 is sized and configured to provide a desired steam reforming feed gas temperature as well as to cool the exiting reformate from reforming reactor 21 to a temperature suitable for the palladium membrane 22.

The reforming reactor feed gas then undergoes a steam reformation reaction according to the following equation:

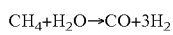

$$CH_4 + H_2O \rightarrow CO + 3H_2$$

In one embodiment, suitable reforming reactors can include any suitable reactor vessel with a steam reforming catalyst. In some embodiments, the reforming reactor comprises an annular shaped reactor that is disposed adjacent and radially inward from catalytic oxidizer 20. In such an embodiment, heat derived from the catalytic oxidizer can be used to heat the reforming reactor.

The reformate from reforming reactor 21 passes through heat exchanger 12 to provide heat to the reforming reactor feed gas and to cool the reformate to a temperature appropriate for passing through the palladium membrane 22 to adjust the carbon monoxide to hydrogen ratio.

The reformate then goes to a palladium membrane to yield synthesis gas with optimum hydrogen to carbon monoxide ratio. In certain embodiments, the ratio is about 2.1:1 or about 2:1.

As previously described, the synthesis gas exiting the palladium membrane 22 passes through heat exchanger 13 in order to preheat the air 1. The synthesis gas then exits heat exchanger 13 and preheats the water 2 in heat exchanger 14. In one embodiment, the synthesis gas exiting heat exchanger 14 is at a temperature and pressure suitable for use as a feed to a Fischer Tropsch reactor.

In certain embodiments, the Fischer Tropsch reactor is disposed downstream from heat exchanger 14. The synthesis gas undergoes an exothermic Fischer Tropsch reaction in presence of a Fischer Tropsch catalyst to produce a liquid hydrocarbon compositions according to the following equation:

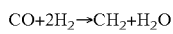

$$CO + 2H_2 \rightarrow CH_2 + H_2O$$

In one embodiment, the heat generated in the Fischer Tropsch reaction is used to heat the reforming reactor feed gas.

Suitable Fischer-Tropsch catalysts are known in the art, and typically include a Group VIII metal component, in one embodiment, cobalt, iron and/or ruthenium. Typically, the catalysts comprise a catalyst earner. In one embodiment, the catalyst carrier is porous, such as a porous inorganic refractory oxide. In one embodiment, the catalyst carrier is alumina, silica, titania, zirconia or mixtures thereof.

The optimum amount of catalytically active metal present on the carrier depends inter alia on the specific catalytically active metal. Typically, the amount of cobalt present in the catalyst may range from 1 to 100 parts by weight per 100 parts by weight of carrier material, in one embodiment, from 10 to 50 parts by weight per 100 parts by weight of carrier material.

The catalytically active metal may be present in the catalyst together with one or more metal promoters or co-catalysts. The promoters may be present as metals or as the metal oxide, depending upon the particular promoter concerned. Suitable promoters include oxides of metals from Groups IIA, IIIB, IVB, VB, VIB and/or VIIB of the Periodic Table, oxides of the lanthanides and/or the actinides. In one embodiment, the catalyst comprises at least one oxide of an element in Group IVB, VB and/or VIIB of the Periodic Table, in particular titanium, zirconium, manganese and/or vanadium. As an alternative or in addition to the metal oxide promoter, the catalyst may comprise a metal promoter selected from Groups VIIB and/or VIII of the Periodic Table. In certain embodiments, metal promoters include rhenium, platinum and palladium.

In one embodiment, a suitable catalyst comprises cobalt as the catalytically active metal and zirconium as a promoter. Another suitable catalyst comprises cobalt as the catalytically active metal and manganese and/or vanadium as a promoter.

The promoter, if present in the catalyst, is typically present in an amount of from 0.1 to 60 parts by weight per 100 parts by weight of carrier material, in one embodiment, from 0.5 to 40 parts by weight per 100 parts by weight of carrier material. It will however be appreciated that the optimum amount of promoter may vary for the respective elements which act as promoter. If the catalyst comprises cobalt as the catalytically active metal and manganese and/or vanadium as promoter, the cobalt: (manganese+vanadium) atomic ratio is advantageously at least 12:1.

In one embodiment, the Fischer-Tropsch synthesis is carried out at a temperature in the range from 125 to 350° C., in another embodiment, 375 to 275° C., in another embodiment, from 200 to 260° C. In one embodiment, the pressure in the Fischer Tropsch reactor ranges from 5 to 150 bar abs., in another embodiment, from 5 to 80 bar abs.

In another embodiment, an apparatus described herein incorporates a catalytic oxidizer, a reforming reactor and a palladium membrane in an integrated annular arrangement. In one embodiment, the elements of the apparatus are inside a cylindrical vessel. A cut out two dimensional schematic illustration of such an apparatus design is shown in FIG. 2.

Figure 2:
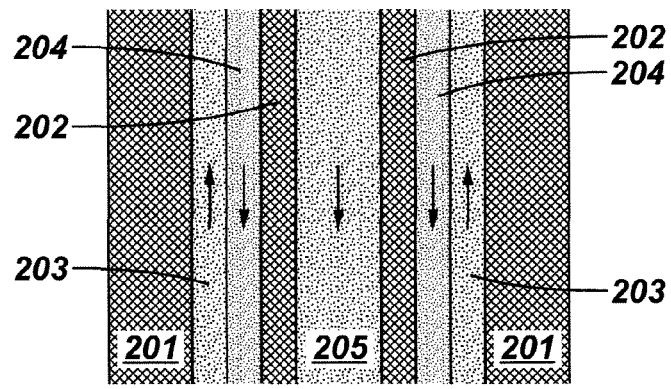
FIG. 2 is a schematic two dimensional illustration of the annular design of an embodiment of the apparatus provided herein.

Referring to FIG. 2, the design incorporates layers of insulation 201 and 202. The outer layer of insulation 201 can be applied either external or internal to the vessel wall. The insulation covers an outer annulus section 203, which houses a catalytic oxidizer. In one embodiment, the oxidizer comprises heat exchanger style fins which are coated with combustion catalyst. Examples of suitable oxidation catalysts include noble metals such as platinum, palladium, rhodium, and/or ruthenium on an alumina wash coat on a monolith, extrudate, pellet or other support. Non-noble metals such as nickel or cobalt have also been used. Other wash coats such as titania, zirconia, silica, and magnesia have also been cited in the literature. Many additional materials such as lanthanum, cerium, and potassium have been cited in the literature as "promoters" that improve the performance of the oxidation catalyst. In an embodiment where the hydrocarbon fuel is natural gas, a suitable catalyst will include a palladium oxide dispersed on a support material comprising a relatively inert refractory inorganic oxide such as alumina, which is optionally impregnated with stabilizers, promoters or other additives.

In one embodiment, towards the center of the apparatus, the annulus section 204 houses a reforming reactor comprising a steam reforming catalyst. In one embodiment, the reforming reactor contains fins which are coated with the steam reforming catalyst. In certain embodiments, the reforming catalyst(s) is in form of pellets, spheres, extrudates, monoliths, as well as common particulates and agglomerates. In one embodiment, the steam reforming catalyst is in the form of a washcoat on the heat exchanger fins. Conventional steam reforming catalysts are well known in the art and can include nickel with amounts of cobalt or a noble metal such as platinum, palladium, rhodium, ruthenium, and/or iridium. The catalyst can be supported, for example, on magnesia, alumina, silica, zirconia, or magnesium aluminate, singly or in combination. Alternatively, the steam reforming catalyst can include nickel. In one embodiment, supported on magnesia, alumina, silica, zirconia, or magnesium aluminate, singly or in combination, promoted by an alkali metal such as potassium. In one embodiment, the reforming reaction is a steam reforming reaction, where the reforming catalyst comprises rhodium on an alumina support. Suitable reforming catalysts are commercially available from companies such as BASF Corporation (Florham Park, N.J.) and Süd-Chemie.

Section 205 houses a palladium membrane to separate hydrogen from the reformate and yield synthesis gas with an optimum hydrogen to carbon monoxide for hydrocarbon generation. In one embodiment, the hydrogen to carbon monoxide ratio is about 2:1.

As schematically illustrated in FIG. 2, in one embodiment, the process flow for the annular vessel is such that the reforming reactor process flow is counter to the oxidizer process flow. In one embodiment, an annulus providing a return flow of reformate to the inlet of the palladium membrane can be included.

In some embodiments, combustion takes place at a pressure of less than about 5 psig, or 1-2 psig. The combustion occurs on the oxidizer fin surfaces when a mixture of air and combustible fuel are introduced. The annular design allows heat generated by this highly exothermic reaction to be transferred directly through the walls separating the oxidizer fins and the reforming reactor fins. The transferred thermal energy supplies the necessary heat for the endothermic steam reforming reaction continuously from inlet to outlet. By directly coupling the heat generating combustion reaction with the endothermic steam reforming reaction, heat transferred is balanced between the two reactions, heat recovery is maximized, and the assembly has less parts and connecting piping. The reformate exiting the reforming reactor is cooled by heat transfer with the reforming reactants and then travels through the palladium membrane where additional hydrogen is taken off and the ratio of hydrogen to carbon monoxide is adjusted to a desired ratio. Steady temperature in the reforming reactor fin section is maintained by controlling the rate of combustion on the oxidizer side. In one embodiment, the rate of combustion is maintained by controlling the air flow rate to the oxidizer. The flow rates of the various feed streams, air, methane-containing gas and combustion feed gas, are controlled by means such as changing blower, pump, and compressor flows, automated or manual control valves, a system controller that automates control over the flows of combustion air, and fuel and water to the reforming reactor, and other similar controllers. Other control means will be apparent to one skilled in the art and are included within the scope of the processes and apparatus described herein.

In one embodiment, the steam reforming fin section operates in this high pressure range to take advantage of the lower compression power needed to compress the steam reforming feeds, methane and water, relative to the compression power that would be required to compress the reformate stream if the reforming reactor were operated at a low pressure. Thus, the annular design in a single vessel allows for operating the oxidizer and reforming reactor at two different pressure regimes without substantial heat loss.

In one embodiment, the annular vessel further comprises a Fischer Tropsch reactor. The synthesis gas exiting from the palladium membrane serves as a feed for the Fischer Tropsch reactor. The annular design allows heat generated by the exothermic Fischer Tropsch reaction to be transferred to the heat exchangers. The transferred thermal energy supplies the necessary heat for the endothermic steam reforming reaction.

In one embodiment, the annular vessel comprises heat exchangers to maximize heat recovery. An embodiment that incorporates the reforming reactor, palladium membrane and heat exchangers within a common housing or vessel is schematically illustrated in FIG. 3.

Figure 3:
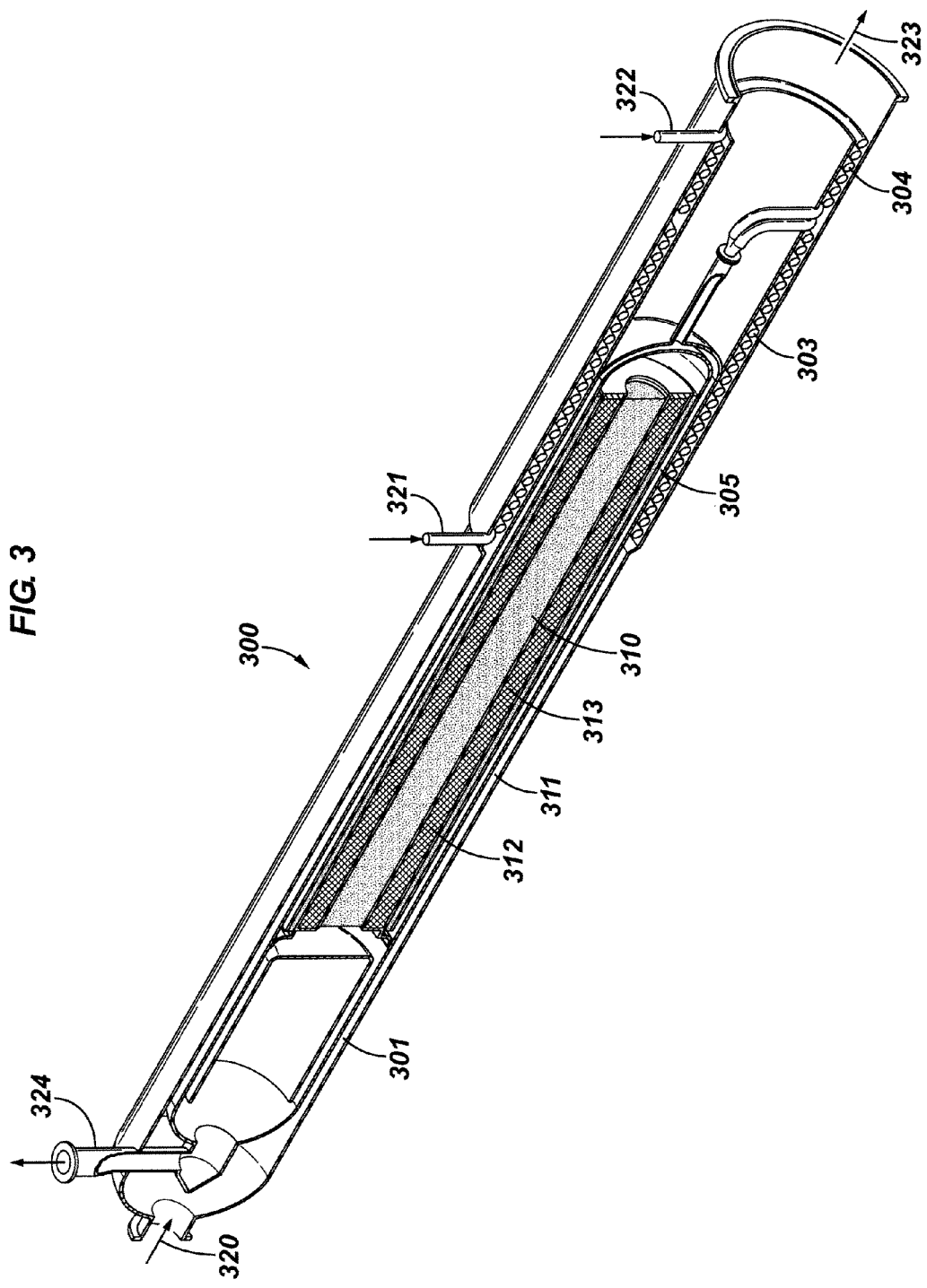
FIG. 3 is a schematic view of a vessel design in an exemplary embodiment provided herein.

Referring to FIG. 3, air and combustion feed gas, and in one embodiment, an off-gas from palladium membrane, can be fed into the vessel 300 via inlet 320. A water inlet 321 and methane-containing gas inlet 322 are also provided. In the embodiment illustrated in FIG. 3, heat exchangers 301, 303, 304, 305 are provided in the vessel. Heat exchanger 301 is adapted to preheat the air/combustion feed gas mixture with heat derived from the synthesis gas exiting the palladium membrane 310. A synthesis gas outlet 324 is provided and an optional heat exchanger (not shown) can be utilized external to vessel 300 to preheat water with heat derived from the synthesis gas exiting the vessel 300 via outlet 324. Heat exchanger 303 is adapted to receive water from water inlet 321 and to preheat the water with heat derived from the exhaust from combustion reactor 311. Heat exchanger 304 is adapted to preheat the methane-containing gas with heat derived from the combustion exhaust. It should be noted that heat exchangers 304 and 305 can be combined into a common or integrated heat exchanger for generating steam and/or pre-heating a methane-containing gas for reforming. A combustion exhaust outlet 323 is provided. Heat exchanger 305 is adapted to further heat a reforming reactor feed gas to the desired reforming reaction temperature with heat derived from the reformate exiting a reforming reactor 313 and to cool the reformate to a temperature suitable for passing the reformate over the palladium membrane in reactor 310. Insulation 312 is adapted to cover and insulate the palladium membrane. In one embodiment, the orientation of vessel 300 is vertical such that the top end is the combustion exhaust outlet 323.

FIG. 4 schematically illustrates an example of an embodiment of a vessel 400 having an outer diameter of about 7.5 inches and a length of about 80 inches. As illustrated, the vessel 400 has a lower outer shell 426 and an upper outer shell 427. The vessel 400 also has an inner, pressure vessel 425 having an outer diameter of about 4 inches. Heat exchanger 405 is adapted to preheat a reforming reactor feed gas. Heat exchanger 401 is adapted to preheat a air/combustion feed gas mixture with synthesis gas exiting a palladium membrane. The preheated air/combustion feed gas mixture is combusted in combustion reactor 411 and that the exhaust from the combustion reaction flows over heat exchanger 403 and heat exchanger 404. Heat exchanger 403 is adapted to pre-heat water with the heat of the combustion exhaust. Heat exchanger 404 is adapted to preheat a methane-containing gas fed with combustion exhaust. Heat exchanger 403 and heat exchanger 404 come together and the gases are mixed in an in-line static mixer before entering the top of the pressure vessel. In one embodiment, the wall thickness for the reforming reactor is about 1.50 inches.

FIG. 5 schematically illustrates a process flow of an embodiment of a vessel 500 provided herein.

The vessels of FIG. 3, FIG. 4 and FIG. 5 illustrate embodiments wherein heat exchangers are used to thermally integrate exothermic reactions steps such as the combustion with the endothermic reaction steps and those process stages where cooling of the process stream is required. The heat exchange elements are selected, sized and configured within, a process and apparatus described herein to minimize heat loss and maximize heat recovery. Effectively, embodiments such as a thermally integrated vessel, eliminate excess piping throughout and reduce initial capital cost. Furthermore, reductions in heat loss equate to higher synthesis gas production efficiency and lower operating costs.

Additionally, embodiments such as a thermally integrated vessel can be thermally neutral so that supplemental fuel, such as methane, is no longer needed in order to achieve high reforming efficiency and conversion. This directly translates to lower operating costs.

Figure 6:
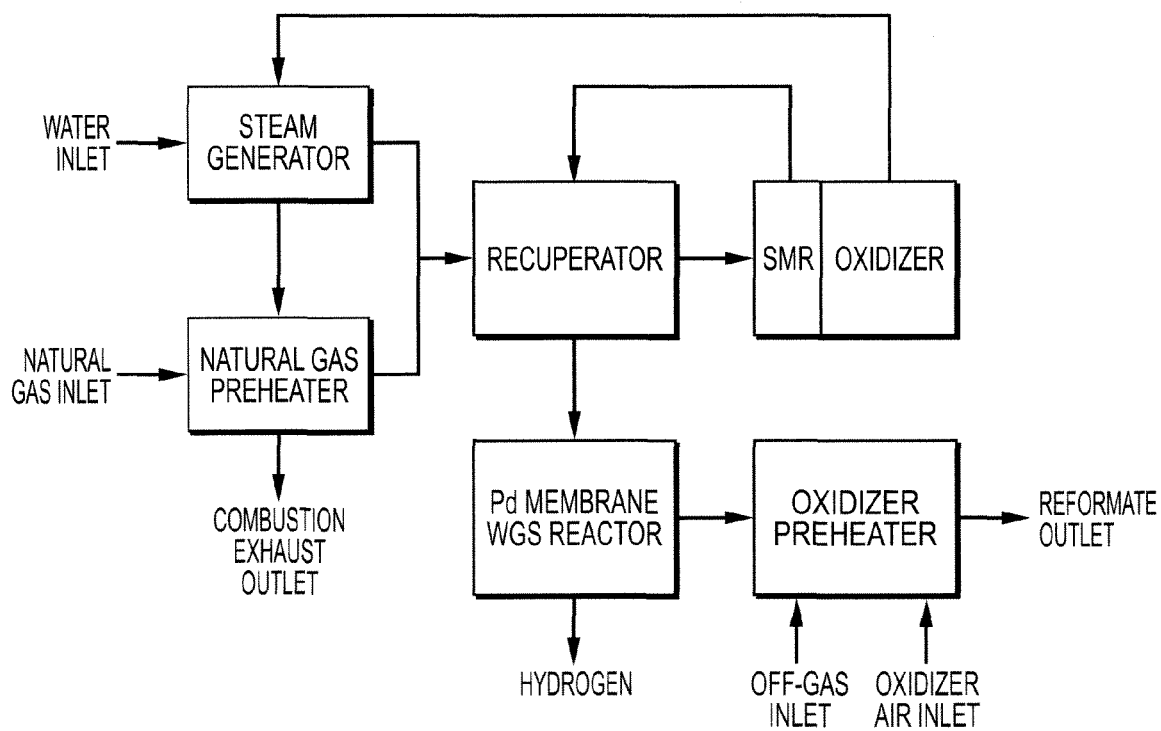
FIG. 6 is a schematic process flow diagram of an embodiment of the process described herein.

In one embodiment, the process flow for preparing synthesis gas and hydrogen is illustrated in FIG. 6. As illustrated in the flow diagram, water and a methane-containing natural gas are heated with a reformate from steam methane reform reactor to form steam, a heated methane-containing gas and a cooled reformate. The cooled reformate then enters the recuperator and is passed through a palladium membrane to form a synthesis gas with the desired ratio of hydrogen to carbon monoxide by separating hydrogen from the reformate. The steam and the heated methane-containing gas react in the SMR reactor to form the reformate.

In the embodiments of the process and apparatus described herein, the surface areas and flow configurations of the heat exchangers are designed such that they serve dual purposes, heat recovery/pre-heating and passive temperature control of process streams. This thermal pinching/passive temperature control technique not only simplifies and adds robustness to the process controls, but also eliminates control valves and various other moving parts throughout the process. Thus, the only necessary active control parameters of the process are air flow to the oxidizer, natural gas and water flows to the reforming reactor. Moreover, no active cooling of process streams such as through the monitoring of temperatures and adjusting flows of a coolant and/or heating fluid is required to maintain a given reaction or process step within the desired temperature range. The uniqueness of the process and apparatus design significantly drives down the capital cost of the system.

Although only exemplary embodiments are specifically illustrated and described herein, it will be appreciated that many modifications and variations of the process and apparatus described herein are possible in light of the above teachings and within the purview of the appended claims without departing from the spirit and intended scope of the claimed subject matter.

All publications and patent applications mentioned in this specification are herein incorporated by reference to the same extent as if each individual publication or patent application was specifically and individually indicated to be incorporated by reference. Although the foregoing has been described in some detail by way of illustration and example for purposes of clarity of understanding, it will be readily apparent to those of ordinary skill in the art in light of the teachings of the claimed subject matter that certain changes and modifications may be made thereto without departing from the spirit or scope of the appended claims.

What is claimed is:

1. A process for preparing a synthesis gas comprising:
    (a) preheating air with a synthesis gas to form pre-heated air and a cooled synthesis gas;
    (b) combusting the preheated air and a combustion feed gas in a catalytic oxidizer to form an exhaust;
    (c) heating water with the exhaust to form heated water;
    (d) contacting a methane-containing gas and the heated water with a reformate to form steam, a heated methane-containing gas and a cooled reformate;
    (e) reforming the steam and the heated methane-containing gas in a reforming reactor to form the reformate and
    (f) separating hydrogen from the cooled reformate in a palladium membrane to form a synthesis gas and hydrogen stream.

2. The process of claim 1, wherein the mole ratio of H2 to CO in the synthesis gas is about 2 to about 1.

3. The process of claim 1, wherein the reforming reaction takes place at about 120 to 350 psig.

4. The process of claim 1, wherein the reforming reaction takes place a temperature of about 750° C. to about 900° C.

5. The process of claim 1, wherein the reforming reaction takes place in presence of a steam reforming catalyst.

6. The process according to claim 1, wherein the methane-containing gas and the heated water are combined prior to heating in a heat exchanger.

7. The process according to claim 1, wherein the combustion feed gas and air are combined prior to preheating the air in a heat exchanger.

8. The process according to claim 1, further comprising heating the water with the liquid hydrocarbon product to form saturated steam prior to heating the water with the exhaust of the catalytic oxidizer.

9. The process according to claim 1, wherein the methane-containing gas is supplied in the form of a natural gas.

10. The process according to claim 1, wherein reforming the heated methane-containing gas and steam in the reforming reactor is controlled in part by adjusting the air flow to the oxidizer.

11. The process of claim 10, wherein reforming the heated methane-containing gas and steam in the reforming reactor is further controlled by adjusting the flow of methane-containing gas to the reforming reactor and the water flow to the reforming reactor.

12. The process of claim 1, wherein the oxidizer and the reforming reactor are operated at different pressures.

13. The process according to claim 1, further comprising pre-heating the methane-containing gas with the exhaust of the catalytic oxidizer prior to heating the methane-containing gas with heat derived from the synthesis gas composition.

14. The process according to claim 1, further comprising heating the reforming reactor with combustion heat from the catalytic oxidizer.

15. The process according to claim 1, wherein the process is conducted in an annular apparatus comprising a oxidizer, a reforming reactor, a palladium membrane and at least three heat exchangers.

16. A process for preparing a liquid hydrocarbon comprising:
(a) preheating air with a liquid hydrocarbon to form a pre-heated air and cooled liquid hydrocarbon;
(b) combusting the preheated air and a combustion feed gas in a catalytic oxidizer to form an exhaust;
(c) heating water with the exhaust to form heated water;
(d) contacting a methane-containing gas and the heated water with a reformate to form steam, a heated methane-containing gas and a cooled reformate;
(e) reforming the steam and the heated methane-containing gas in a reforming reactor to form the reformate;
(f) separating hydrogen from the cooled reformate in a palladium membrane to form a synthesis gas and hydrogen stream; and
(g) reacting the synthesis gas in a Fischer Tropsch reactor to form the liquid hydrocarbon.

17. The process of claim 16, wherein the Fischer Tropsch reactor comprises a Fischer Tropsch catalyst comprising Pd, Co, Fe, Ni, Ru, Re, Os, or an oxide thereof, or a mixture of two or more thereof.

18. The process of claim 17, wherein the catalyst comprises a promoter selected from a metal from Group IA, IIA, IIIB or IIB of the Periodic Table or an oxide thereof, a lanthanide metal or oxide, an actinide metal or oxide, or a combination of two or more thereof.

19. The process of claim 17, wherein the catalyst comprises a support selected from alumina, zirconia, silica, aluminum fluoride, fluoride alumina, bentonite, ceria, zinc oxide, silica-alumina, silicon carbide, a molecular sieve, or a combination of two or more thereof.

20. A process for preparing a synthesis gas comprising:
(a) preheating air with a synthesis gas to form pre-heated air and cooled synthesis gas;
(b) combusting the preheated air and a combustion feed gas in a catalytic oxidizer to form an exhaust;
(c) heating water with the exhaust to form heated water;
(d) contacting a methane-containing gas and the heated water with a reformate to form steam, a heated methane-containing gas and a cooled reformate; and
(e) reforming the steam and the heated methane-containing gas in a reforming reactor to form the synthesis gas, wherein the temperature in the reforming reactor is from about 700-900° C. and the pressure is about 350 psi.

21. A process for preparing a liquid hydrocarbon comprising:
(a) preheating air with a liquid hydrocarbon to form a pre-heated air and cooled liquid hydrocarbon;
(b) combusting the preheated air and a combustion feed gas in a catalytic oxidizer to form an exhaust;
(c) heating water with the exhaust to form heated water;
(d) contacting a methane-containing gas and the heated water with a reformate to form steam, a heated methane-containing gas and a cooled reformate;
(e) reforming the steam and the heated methane-containing gas in a reforming reactor to form the synthesis gas, wherein the temperature in the reforming reactor is from about 700-900° C. and the pressure is about 350 psi; and
(g) reacting the synthesis gas in a Fischer Tropsch reactor to form the liquid hydrocarbon.

* * * * *